April 4, 1939.  W. V. MAGEE ET AL  2,153,093
UNIVERSAL COUPLING
Filed Oct. 17, 1936   2 Sheets-Sheet 1
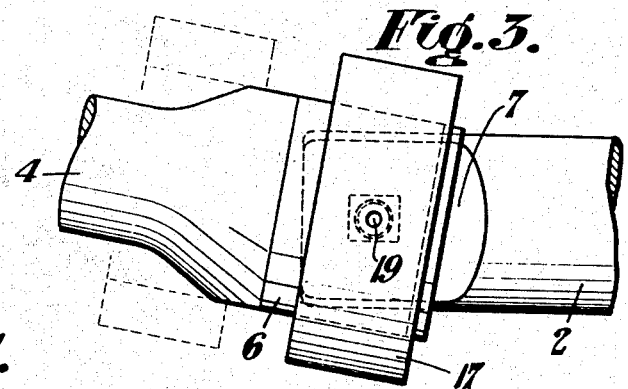
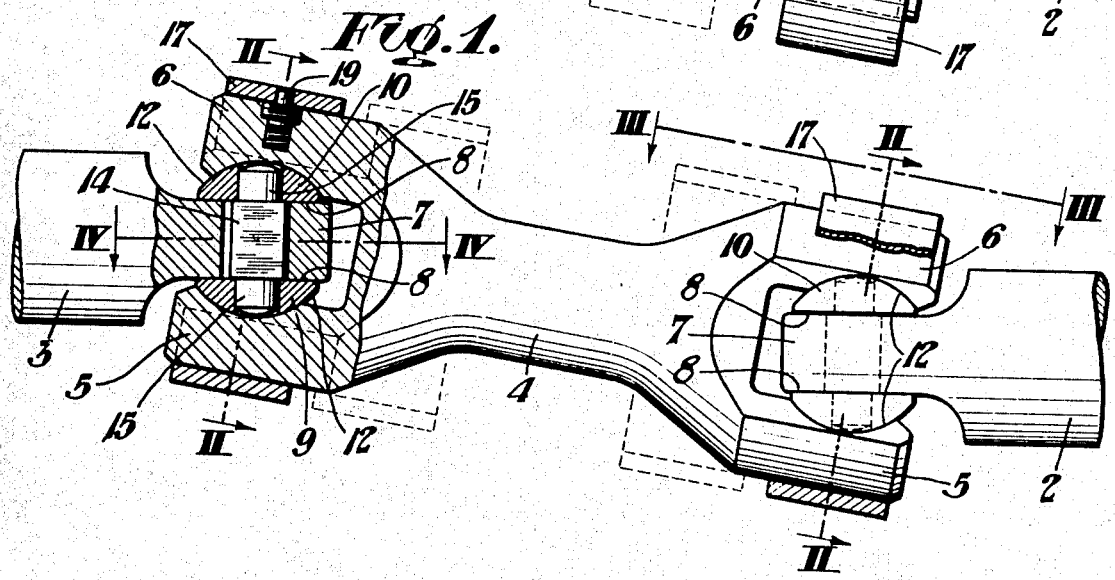
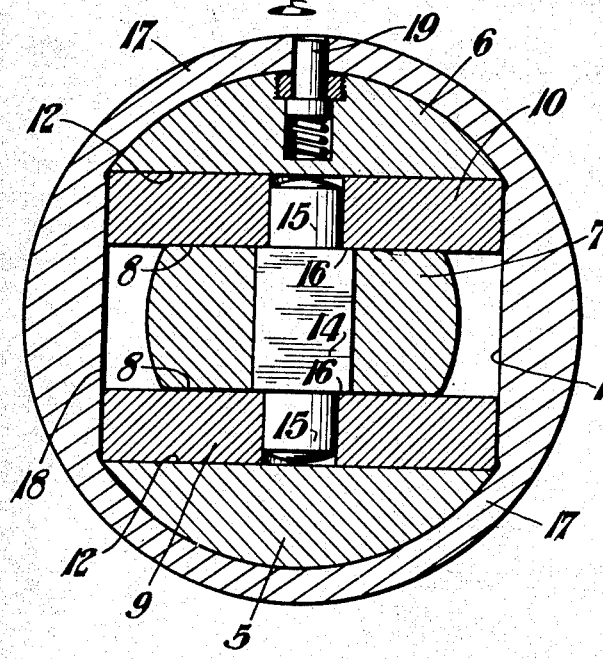
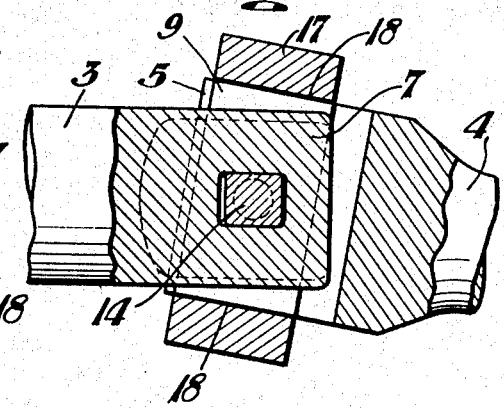
Inventors:
WALTER V. MAGEE and
LOUIS L. MILLER.
by: their Attorneys.

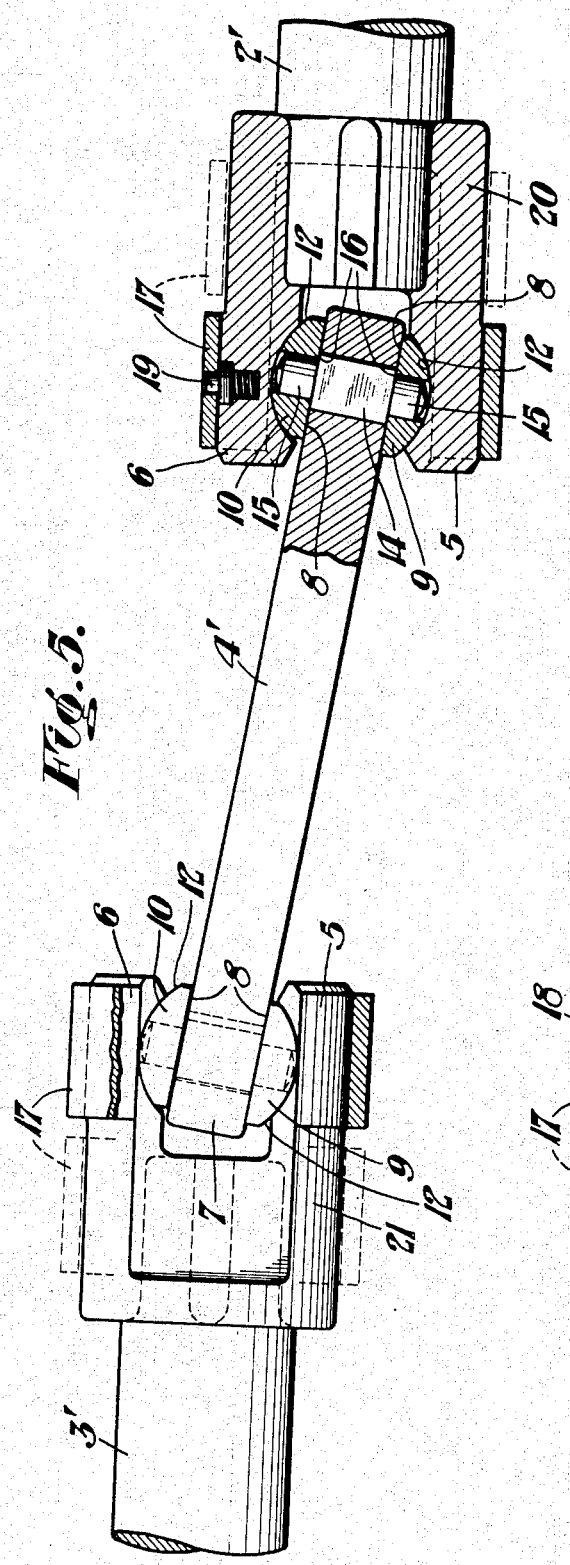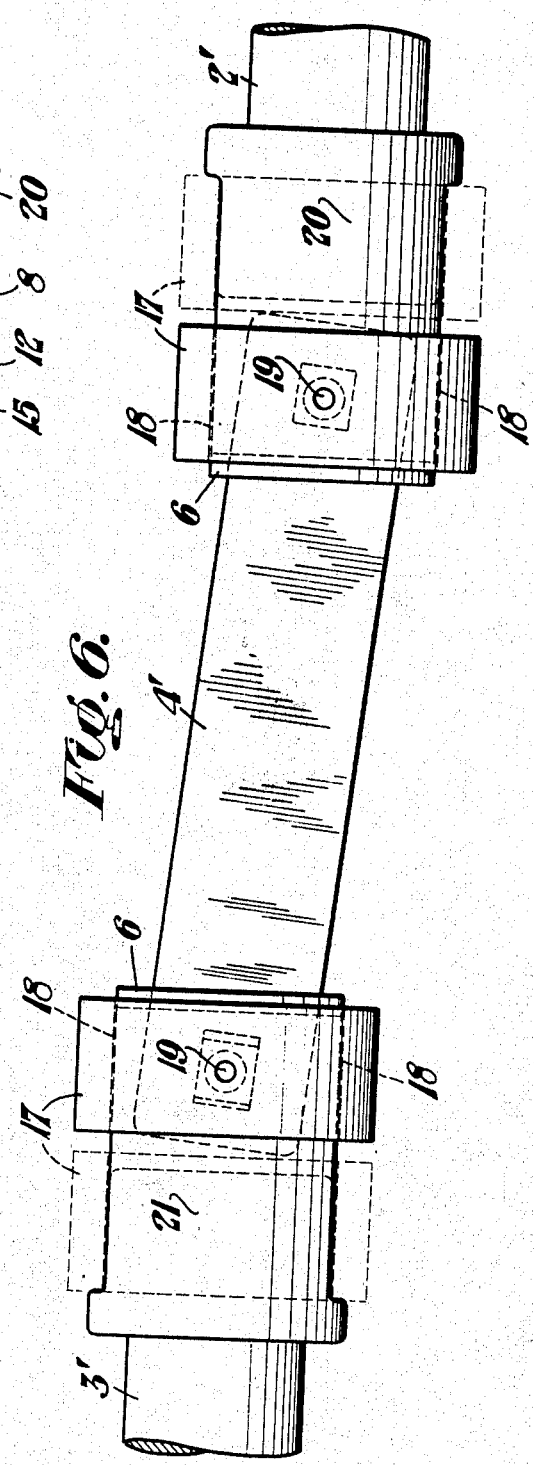

Patented Apr. 4, 1939

2,153,093

UNITED STATES PATENT OFFICE 2,153,093

UNIVERSAL COUPLING

Walter V. Magee, Lakewood, and Louis L. Miller, Cleveland, Ohio, assignors to The American Steel and Wire Company, a corporation of New Jersey Application October 17, 1936, Serial No. 106,230

3 Claims. (Cl. 64—7)

The present invention relates to an improvement in universal couplings for shafting and the like, and more particularly to couplings adapted to connect roll and pinion-shafts in a rolling-mill.

One object of this invention is the provision of a coupling that will function well in all positions of its connecting parts without binding or causing undue strains, and at the same time be easily engaged and disengaged.

With this and other advantages which will become apparent as the disclosure proceeds, Figure 1 is a side elevation, partly in section, of the coupling applied between two shafts, Figure 2 is a section on line II—II of Figure 1, Figure 3 is a plan looking down in the direction of the arrows of the line III—III of Figure 1, Figure 4 is a section on line IV—IV of Figure 1, Figure 5 is a side elevation, partly in section, of a coupling applied between two shafts with an interchanging of the male and female sections of Figure 1, and Figure 6 is a plan of Figure 5.

In the drawings, the numerals 2 and 3 designate, respectively, the driving and driven shafts adapted to be connected by the coupling spindle 4. The ends of the shafts 2 and 3 constitute the male members of the coupling while female members are formed on either end of the spindle 4. The head or female member of each coupling 4 is provided with two parallel jaws 5 and 6 between which lie tongues 7 formed by the ends of said shafts 2 and 3. These tongues have flat bearing surfaces 8. In contact with these flat surfaces and secured as cylindrical surfaces between said jaws 5 and 6 are interposed two members 9 and 10 having flat ends at right angles to the axis of said members. The tongues 7 are adapted to rotate integrally with said members 9 and 10 within said jaws 5 and 6 about an axis on the cylindrical surfaces 12 of said members 9 and 10.

In order to provide another turning axis at right angles to the above referred to axis, a substantially rectangular pin 14 provided with cylindrical trunnion ends 15 is inserted through a rectangular opening in said tongues 7 and adapted to be journaled in said members 9 and 10. The pin 14 is prevented from turning due to its rectangular shape engaging the rectangular opening in the tongues 7, while endwise movement is prevented by said pin being shouldered against said members 9 and 10, as shown at 16 in Figure 2.

The assembly above described is held in place by means of a sleeve 17 which is of uniform and concentric thickness except at right angles to the axis of the cylinder formed by said members 9 and 10. At these points, the sleeve 17 is so shaped as to present a flat surface 18 to said members and jaws. The function of such a construction is to prevent endwise motion parallel with the center line of the assembly and to provide ample bearing area for rotary motion on this plane. The retaining sleeve is kept from turning by the flat inside surfaces 18 and held against endwise motion by means of a latch 19.

In the Figures 5 and 6 a similar construction is shown, 2' and 3' representing the driving and driven shafts, respectively, adapted to be connected by the coupling spindle 4'. Under this form of construction, the spindle 4' constitutes the male member of the coupling while the female members 20 and 21 are keyed to the shafts 2' and 3'. The construction of the female members 20 and 21 are identical with the end portions of the female members shown in Figure 1 while the coupling ends of the male member 4' are identical with the ends of the male members illustrated in Figure 1.

Should it be desired to disconnect the coupling, the sleeve 17 is moved endwise to the dotted line positions shown in Figures 1 and 3 so as to be clear of the members 9 and 10 on each end, after which the spindles 4 or 4' can be drawn out laterally along the center line of said members 9 and 10.

While we have shown and described specific embodiments of the present invention, it will be understood that we do not wish to be limited exactly thereto, since various modifications may be made without departing from the scope of the invention as defined in the following claims.

We claim:

1. In a universal coupling, a driving element and a driven element, one of said elements comprising a substantially cylindrical bar having diametrically opposite parallel flat surfaces at one end thereof, a cylindrical recess extending at right angles to said flat surfaces, said recess opening at one of its ends upon one of said surfaces and along one of its sides onto the end of said bar, a pair of semi-cylindrical members carried in spaced relation within said recess, each of said members having a flatted end portion lying within the plane of one of said flat surfaces, the other of said elements lying between said semi-cylindrical members and being pivoted thereto on an axis falling diametrically of said recess, and a removable sleeve secured about and closely conforming to said bar having complementary inner flat portions in registration with the flat surfaces thereon, said surfaces being adapted to retain said members and elements in position and to prevent rotary motion of said sleeve with respect thereto.

2. A universal coupling comprising a driving element and a driven element, one of said elements at its end adjacent to the other element being provided with a recess having its longitudinal axis at right angles to the axis of rotation of said coupling, a bearing assembly in said recess being adapted for rotation therein having its axis of rotation coincident with said longitudinal axis of the recess, a pivot member carried by said bearing assembly, the other of said elements being connected by said pivot member to said bearing assembly, the pivotal axis of said connection being normal to the longitudinal axis of said recess and to the axis of rotation of said bearing assembly, a sleeve removably secured around the recessed-element and bearing assembly to retain the same together, and a bearing surface carried by said sleeve in engagement with said bearing assembly.

3. In a universal coupling, a drive shaft and a driven shaft, a coupling element extending between said shafts, the connections between said coupling and shafts being characterized by a pair of cylindrical cavities extending substantially normal to the rotational axis of the assembly, a pair of tongues, a complementary cylindrical bearing disposed in each of said cylindrical cavities, a pivot member substantially normal to the rotational axis of each of said cylindrical bearings, one of said tongues being secured by one of said pivot members to one of the cylindrical bearings so as to preclude relative movement therebetween in directions axially of the assembly, the other of said tongues being secured by the other of said pivot members to the other of the cylindrical bearings so as to permit relative movement therebetween in directions axially of the assembly, a pair of collars circumjacent to each of said connections to retain them together, and flat bearing surfaces on each of said collars against which said bearing assemblies respectively bear.

WALTER V. MAGEE.
LOUIS L. MILLER.